United States Patent
Ricklis et al.

(10) Patent No.: US 12,088,466 B1
(45) Date of Patent: Sep. 10, 2024

(54) PERFORMING SCALABLE NETWORK UPGRADES

(71) Applicant: Goldman Sachs & Co. LLC, New York, NY (US)

(72) Inventors: Joshua Ricklis, Fair Lawn, NJ (US); Zachary Meath, Stratham, NH (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 18/118,057

(22) Filed: Mar. 6, 2023

(51) Int. Cl.
  *H04L 12/00* (2006.01)
  *H04L 41/082* (2022.01)
  *H04L 41/0823* (2022.01)

(52) U.S. Cl.
  CPC ........ *H04L 41/0836* (2013.01); *H04L 41/082* (2013.01)

(58) Field of Classification Search
  CPC .................................................. H04L 41/0836
  USPC .................................................. 709/220–222
  See application file for complete search history.

(56) References Cited

U.S. PATENT DOCUMENTS

| | | | | |
|---|---|---|---|---|
| 11,329,900 | B1* | 5/2022 | Johnston | H04L 41/5006 |
| 11,522,807 | B2* | 12/2022 | Ros-Giralt | H04L 47/781 |
| 2003/0158765 | A1* | 8/2003 | Ngi | G06Q 10/06375 |
| | | | | 705/7.22 |
| 2006/0159020 | A1* | 7/2006 | Porat | H04L 45/42 |
| | | | | 370/235 |
| 2007/0008884 | A1* | 1/2007 | Tang | H04L 9/40 |
| | | | | 370/230 |
| 2007/0165541 | A1* | 7/2007 | Arpee | H04L 1/245 |
| | | | | 370/254 |
| 2009/0064127 | A1* | 3/2009 | Schneider | G06F 8/65 |
| | | | | 717/170 |
| 2011/0141945 | A1* | 6/2011 | Eriksson | H04L 45/24 |
| | | | | 370/254 |
| 2013/0281065 | A1* | 10/2013 | Harris | H04W 64/006 |
| | | | | 455/414.1 |
| 2015/0071082 | A1* | 3/2015 | Govindarajeswaran | |
| | | | | H04L 43/065 |
| | | | | 370/242 |
| 2018/0375718 | A1* | 12/2018 | Anand | H04L 41/082 |
| 2019/0026175 | A1* | 1/2019 | Shelke | G06F 11/0775 |
| 2020/0389352 | A1* | 12/2020 | Hu | H04L 41/0886 |
| 2023/0246969 | A1* | 8/2023 | Ros | H04L 45/02 |
| | | | | 370/235 |

* cited by examiner

*Primary Examiner* — Frantz Coby
(74) *Attorney, Agent, or Firm* — Fenwick & West LLP (57) ABSTRACT

A system performs upgrade of a network that includes network devices that provide connectivity to servers. The system performs network upgrade by evaluating a set of upgrade criteria for each network device to determine whether to upgrade the device or delay upgrading the network device. Each upgrade criterion is based on a relation between the selected network device and other network devices currently being upgraded. After completing the upgrade, the system determines whether the network upgrade completed successfully. The system determines whether the network upgrade completed successfully by determining a pre-snapshot representing a state of the network before network upgrade and a post-snapshot representing a state of the network after network upgrade. The system compares the pre-snapshot and the post-snapshot to determine whether the network upgrade completed successfully.

20 Claims, 6 Drawing Sheets

PERFORMING SCALABLE NETWORK UPGRADES

FIELD OF ART

The disclosure relates to computer networks in general and more specifically to performing scalable upgrades of networks.

BACKGROUND

Organizations that use several computing systems use networks to allow the computing systems to interact with each other. The networks include several network devices, for example, switches and routers that run software such as network operating systems. The software executing on the network devices needs to be updated for various reasons. For example, if a network vulnerability is discovered, a software patch may have to be installed urgently on the network devices. A network may have several network devices that may be used by a large number of computing systems for connectivity. The process of upgrading the network devices may be automated or orchestrated manually issuing commands to copy files to specific network devices and execute upgrade scripts. This is often cumbersome and error prone process. Furthermore, upgrading of network devices may cause several computing systems to lose connectivity during the upgrade process. This causes loss of network access to computing systems of the organization.

SUMMARY

A system according to various embodiments, performs upgrade of a network. The network includes network devices that provide connectivity to servers. The system receives a network topology of the network. The network topology may be represented as a topology graph including nodes and edges where nodes represent network devices and edges represent connections between network devices.

The system performs network upgrade by executing the following steps repeatedly. The system selects a network device for upgrading. The system evaluates a set of upgrade criteria. Each upgrade criterion is based on a relation between the selected network device and other network devices currently being upgraded. The system determines whether to upgrade the selected device based on evaluation of the upgrade criteria. The system performs one of (1) upgrading the selected network device or (2) delaying upgrade of the selected network device based on the result of evaluation of the set of upgrade criteria. The system determines whether the upgrade of each network device completed successfully.

The upgrade criteria may be as follows. An upgrade criterion may indicate that a network device is not upgraded if it is directly connected to another network device being currently upgraded. An upgrade criterion may indicate that two network devices are not upgraded simultaneously if any of the two network devices has a neighboring network device with incomplete topology information. An upgrade criterion may indicate that a network device is not upgraded if upgrading the network device will remove from service, more than a threshold percentage of viable paths to a portion of the network.

According to an embodiment, the system determines whether the upgrade of a network device completed successfully by determining a pre-snapshot including attributes representing a state of the network before network upgrade and a post-snapshot including attributes representing a state of the network after network upgrade. The system compares the pre-snapshot and the post-snapshot to determine whether upgrade of one or more network devices failed.

Embodiments of the invention include methods described herein, computer readable non-transitory storage medium that stores instructions for performing steps of the methods disclosed herein, and systems comprising processors and computer readable non-transitory storage medium to perform steps of the methods disclosed herein.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

A system according to various embodiments performs upgrades of networks in a scalable manner. A large organization may have several computing systems that are connected via network devices. The system may upgrade software on the network devices, for example, the network operating system (NOS). There may be several thousand network devices that may be upgraded. The network upgrade may be a regular scheduled upgrade when a new version of the software is received. The network upgrade may have to be expedited in certain situations, for example, when a network vulnerability is discovered. The upgrade may cover various devices in user spaces, data centers, network core environments, and so on.

The processes disclosed herein allow automatic upgrade of the network while minimizing manual steps. As a result, the process executes efficiently, reduces burden on the users performing the upgrades, and minimizes errors. The ability to execute the network upgrades efficiently reduces the time that a known vulnerability can be exploited by a malicious entity or may cause accidental damage to computing systems of the organization, for example, loss or unwanted exposure of sensitive information.

Overall System Environment

Figure 1:
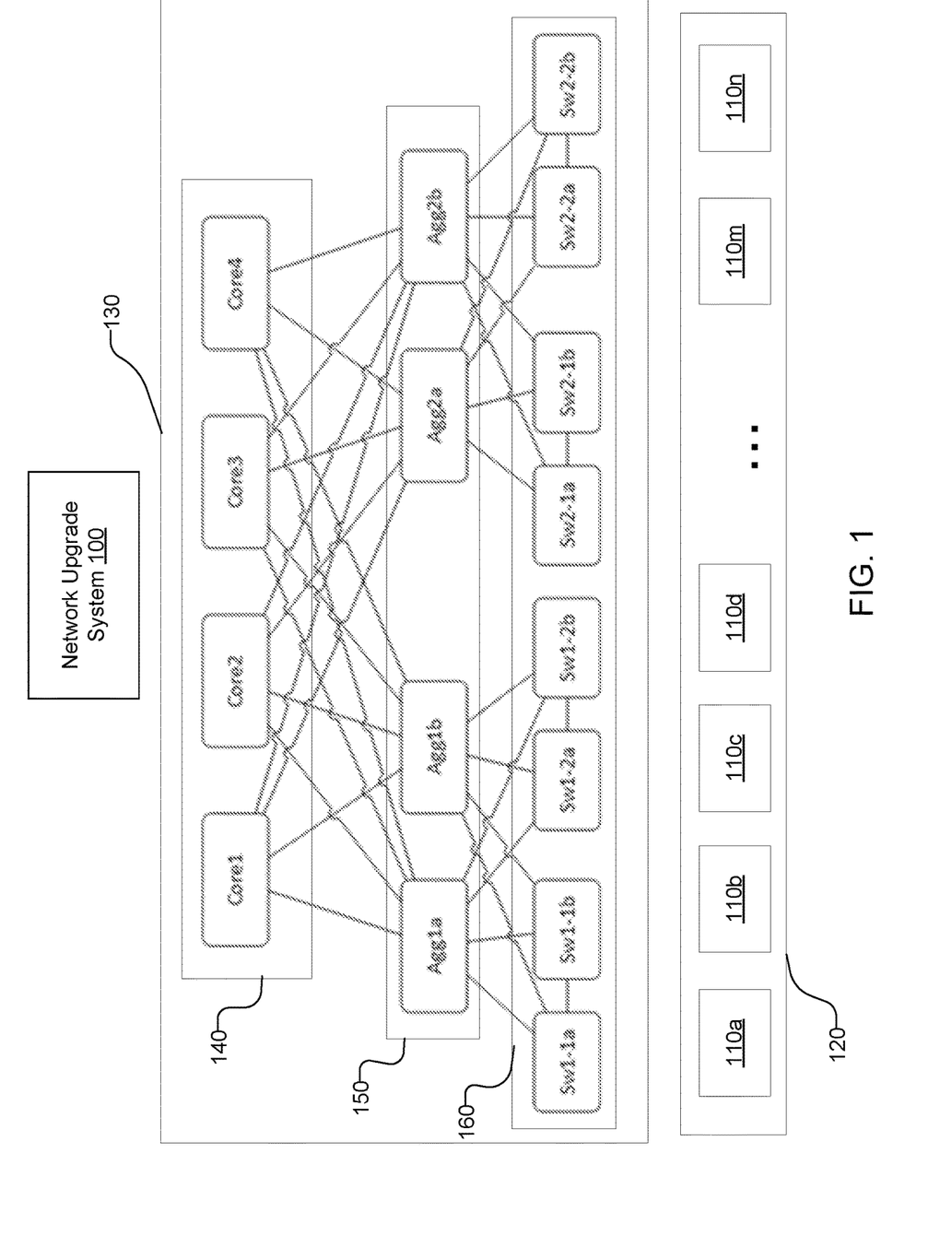
FIG. 1 shows the overall system environment for performing a network upgrade, according to an embodiment.

FIG. 1 shows the overall system environment for performing a network upgrade, according to an embodiment. The overall system environment a set 120 of computing systems, a set 130 of network devices, and a network upgrade system 100. In other embodiments, more or less components than those indicated in FIG. 1 may be used. For example, there may be more or fewer instances of network devices shown in FIG. 1.

FIG. 1 and the other figures use like reference numerals to identify like elements. A letter after a reference numeral, such as "120*a*," indicates that the text refers specifically to the element having that particular reference numeral. A reference numeral in the text without a following letter, such as "120," refers to any or all of the elements in the figures bearing that reference numeral (e.g. "120" in the text refers to reference numerals "120*a*" and/or "120*b*" in the figures).

The set 120 of computing systems may include laptops, workstations, servers, phones, and other devices that may be used in an organization that are connected via a network. The set 120 may include a large number of computing systems, for example, computing system 110*a*, 110*b*, 110*c*, 110*d*, 110*m*, 110*n*, and so on.

The set 130 of network devices includes routers, switches and other devices that are used to connect the computing systems 110. The set 130 of network devices of the network includes a set 140 of core routers, a set 150 of aggregation routers, and a set 160 of access switches. The set 140 includes four core routers. The set 150 includes two sets of aggregation routers, i.e., a set of aggregation routers Agg1*a* and Agg1*b* and another set of aggregation routers Agg2*a* and Agg2*b*. The set 160 includes four pairs of access switches, i.e., a pair Sw1-1*a* and Sw1-1*b*, a pair Sw1-2*a* and Sw1-2*b*, a pair Sw2-1*a* and Sw2-1*b*, and pair Sw2-2*a* and Sw2-2*b*.

An upgrade of a network device may be performed by copying a software image to the network device, for example, a network operating system image. The upgrade of a network devices may be performed by executing an upgrade script or command that installs the NOS image received by the network device.

Figure 2:
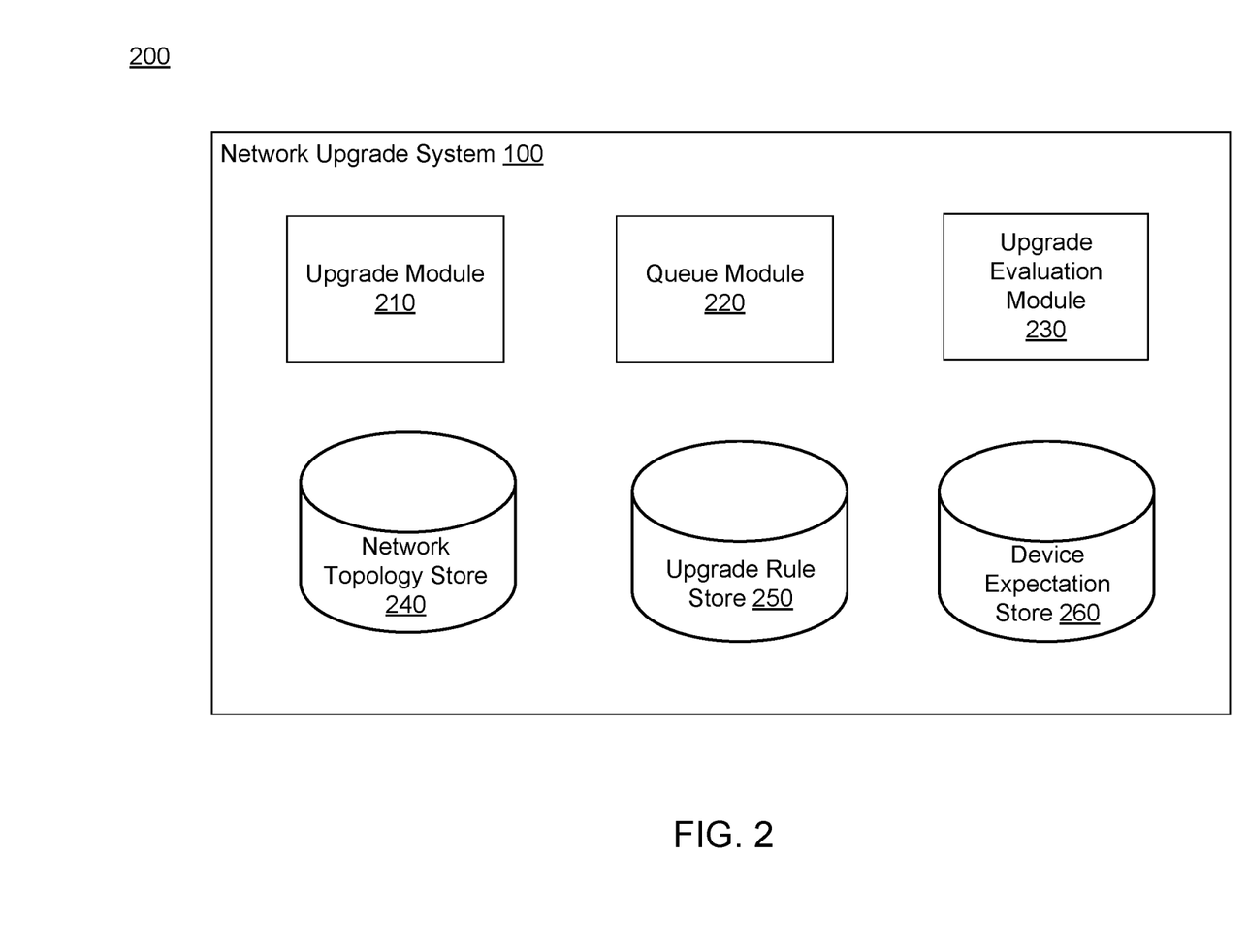
FIG. 2 shows the system architecture of the network upgrade system, according to an embodiment.

The details of the network upgrade system 100 are illustrated in FIG. 2 and described in detail in connection with FIG. 2.

System Architecture

FIG. 2 shows the system architecture of the network upgrade system, according to an embodiment. The network upgrade system 100 includes an upgrade module 210, a queue module 220, an upgrade evaluation module 230, a network topology store 240, an upgrade rule store 250, and a device expectation store 260. In other embodiments, the network upgrade system 100 may include other modules not described herein. Functionality indicated as provided by a particular module may be implemented by other modules instead.

Figure 3:
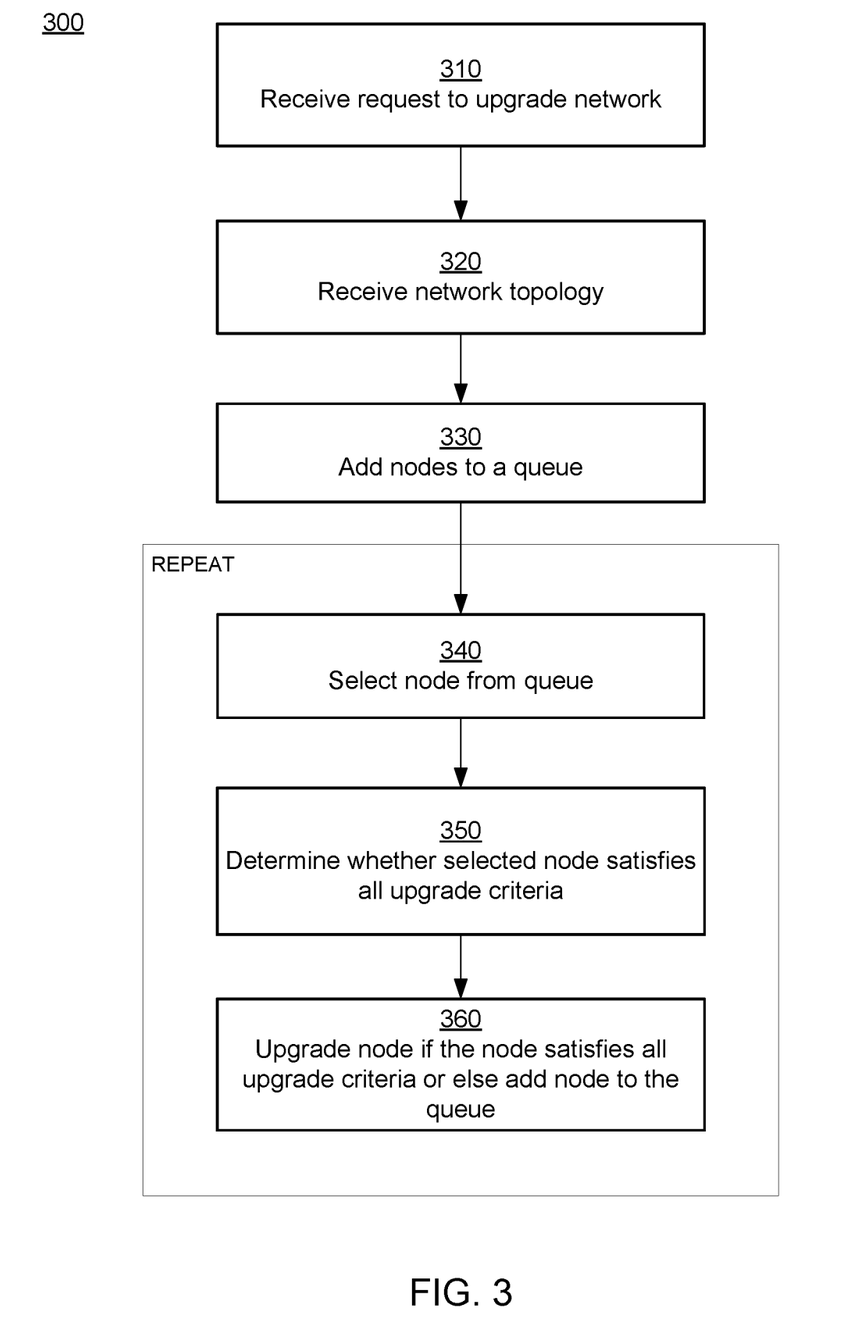
FIG. 3 shows a flowchart illustrating the process for performing the overall upgrade process for the network, according to an embodiment.

The upgrade module 210 orchestrates the overall upgrade process for the network, for example, using the process illustrated in FIG. 3. The upgrade module 210 invokes the queue module 220 that maintains a queue data structure for storing objects representing network devices that are being upgraded. The queue data structure is used for delaying upgrade of a network device for certain time period if necessary. According to an embodiment, the queue is a first in first out (FIFO) queue such that an object representing a network device that is added to the back of the queue is picked up for processing after all network devices that are ahead of the network device are processed. The processing of an object representing a network device may start the execution of the upgrade of that network device. Several network devices may be upgraded in parallel.

The upgrade evaluation module 230 determines whether the upgrade of a network device completed successfully. The device expectation store 260 stores information describing expectation from a network device after performing an upgrade. The information describing the expectation may be represented as a nested object comprising attributes, for example, a JSON (JavaScript Object Notation) object. The upgrade evaluation module 230 uses the information describing the expectation from a network device to determine whether the upgrade of the network device completed successfully.

The network topology store 240 stores the topology of a network. The network topology may store a topology graph representation of the network. The topology graph includes nodes and edges, where each node represents a network device and the topology graph includes an edge between two nodes if the two network devices corresponding to the two nodes have a direct network connection.

The upgrade rule store 250 stores rules representing criteria for determining whether a network device should be upgraded at a particular time, given the information about other network devices that are currently being upgraded.

Process for Performing Network Upgrade

FIG. 3 shows a flowchart illustrating the process for performing the overall upgrade process for the network, according to an embodiment. The steps of the process may be performed in an order different from that indicated herein, to the extent permitted by the data flow of the process. The steps are indicated as being performed by a system, for example, the network upgrade system 100 and may be performed by modules of the system, for example, the modules shown in FIG. 2.

The system receives 310 a request to upgrade the network. The system may receive one or more NOS images or other software artifacts that store executable instructions of the upgraded software. The system receives 320 the network topology of the network. The network topology may be represented as a network topology graph comprising nodes and edges. The system adds 330 nodes of the network topology graph to a queue. The queue determines the initial order in which the system picks up nodes for processing. The nodes may not be upgraded based on the initial order, but the system analyzes each node in the initial order to determine whether to start the upgrade process or delay the upgrade process for the network device represented by that particular node.

The system repeats the steps 340, 350, and 360 until the upgrade of the network is completed. The system selects 340 a node N from the front of the queue. The system analyzes the node N in connection with the remaining nodes that are currently being upgraded to determine whether the upgrade of the selected node N can be started or should be delayed. The system determines whether to start the upgrade of the selected node N by determining 350 whether the selected node satisfies a set of upgrade criteria. The upgrade criteria are represented as rules stored in the upgrade rule store 250.

If the node N1 satisfies all the upgrade criteria, the system starts upgrade of the node and continues processing the steps 340, 350, 360 for another node in the queue. If the node N1 does not satisfy all the upgrade criteria, the system delays the upgrade of the node by adding the node N1 to the queue, for example, by pushing the node N1 to the end of the queue so that the node N1 is selected for processing after other nodes that are now ahead of the node in the queue are processed. If the system manages to analyze all the nodes ahead of the node N1 and picks up the node N1 again, the system determines whether the any of the other nodes that were being upgraded when the node N1 was moved to the end of the queue have completed upgrades. If none of the other nodes have completed their upgrades the upgrade status of the network is same as what the upgrade status was when the node N1 was put to the end of the queue. In this situation, the system waits until at least a node N2 completes the upgrade. If the system receives indication that one or more nodes completed their upgrade, the system re-evaluates the node N1 to determine whether the upgrade of the node N1 can proceed. It is possible that the node N2 that completed the upgrade is unrelated to the node N2 and does not affect the result of evaluation of the upgrade criteria for node N1. In this situation, the system continues waiting before starting the upgrade of node N1. However, if the node N2 that completed upgrade is related to the node N1 in a way that completing the upgrade of the node N2 affects the result of evaluation of the upgrade criteria for node N1, it is possible that the system determines 350 that the node N1 now satisfies all upgrade criteria, and the system starts the upgrade process for node N1.

Figure 4A:
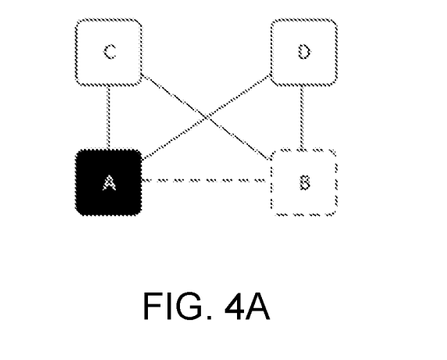
FIG. 4A illustrates a first rule R1 for determining whether a node can be upgraded according to an embodiment.
Figure 4B:
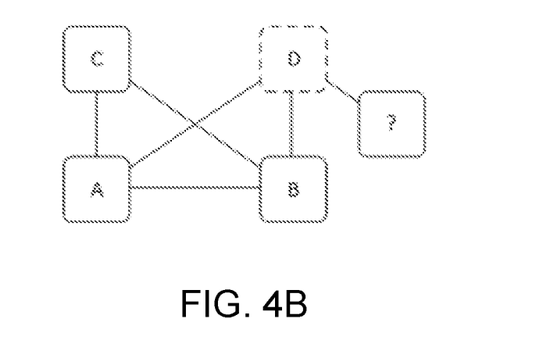
FIG. 4B illustrates a second rule R2 for determining whether a node can be upgraded according to an embodiment.

The upgrade rule store stores rules representing criteria used by the system to determine whether a node can be upgraded according to an embodiment. FIGS. 4A-B illustrate various rules through examples.

FIG. 4A illustrates a first rule R1 for determining whether a node can be upgraded according to an embodiment. The rule R1 illustrated in FIG. 4A represents the criterion that the system should not upgrade directly connected neighbors at the same time. Directly connected neighbors are also referred to as physically connected neighbors. This rule causes the system to properly handle access switches at the edge of a network. If computing systems 110 of the network are connected to two switches, those two switches are typically physically connected to each other although not necessary. This rule allows the system to detect such relationships and only upgrade one switch at a time. According to an embodiment, the system maintains an inventory of switches that provide resilient service but are not physically connected to each other. The system may check that inventory to augment the neighbor information while making a decision regarding upgrading of a switch. Accordingly, two switches are determined to be physically not connected to each other according to the inventory, the system allows the upgrade of the two switches to proceed simultaneously based on this particular rule.

Another reason for disallowing simultaneous upgrades of two network devices that are directly connected to each other is to avoid false positives when reporting status of network devices. For example, assume that the system upgrades network devices A and B that are physically connected to each other. If the system takes a state snapshot and gathers neighbor information for A, the system determines that B is connected. If the system subsequently upgrades A and then upgrades B, the network device may be missing from A's neighbor list when the system takes A's post-snapshot since the network device B may still be reloading. As a result, the system may flag this as an exception. A network operator may spend resources investigating why B is missing. However, after sufficient delay, B finishes its upgrade process and reappears as a neighbor for A. This results in waste of resources due to system flagging devices as missing as a result of simultaneous upgrade when they are not missing. Enforcing the rule to avoid simultaneous upgrades of network devices that are directly connected avoids this issue and avoids wasting resources. As illustrated in FIG. 4A, the network device A is currently upgrading and the system will not allow the network device B to be upgraded until the upgrade of network device A completes since network devices A and B are physically connected to each other.

FIG. 4B illustrates a second rule R2 for determining whether a node can be upgraded according to an embodiment. The second rule disallows simultaneous upgrade of multiple network devices if there is an unknown neighbor connected to one of the network devices, or if the system identifies a neighbor for one of the network devices for which the system does not have a complete topology information. The system ensures that devices at each network layer have resilient connectivity to devices at the layers above and below (if applicable). Accordingly, if the system identifies network devices for which the system has incomplete topology information, the system takes a conservative approach and only upgrades the neighbors of such a device one at a time. This has the effect of forcing the entire upgrade process to only execute one upgrade at a time until the system finishes the unknown neighbor device. Accordingly, the system gives higher priority to avoiding network outages then attempting to complete the network upgrade fast. A network device may appear as an unknown neighbor if the network device has ongoing provisioning activities that have not yet completed. As shown in FIG. 4B, the network device D has an unknown neighbor indicated as a question mark, for example, because the system does not have complete topology information for the unknown neighbor. Accordingly, the system does not upgrade the network devices A and B simultaneously with device D based on the second rule. Note that the example shown in FIG. 4B is illustrative and upgrade of devices A and B simultaneously with deice D will be prevented by rule R1. However, if the configuration shown in FIG. 4B was a part of a larger configuration in which upgrade of A or B was not prevented by rule R1, the upgrade will get prevented by rule R2 for the above reasons.

Figure 4C:
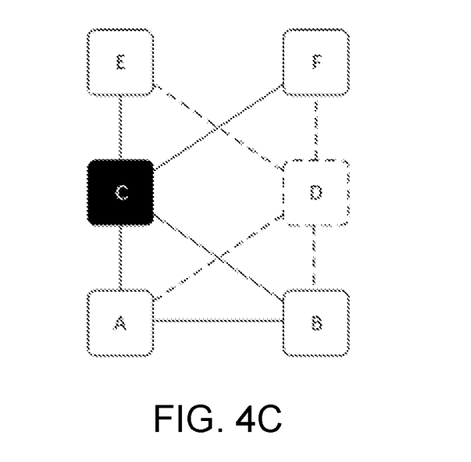
FIG. 4C illustrates a third rule R3 for determining whether a node can be upgraded according to an embodiment.

FIG. 4C illustrates a third rule R3 for determining whether a node can be upgraded according to an embodiment. According to rule R3, the system does not upgrade a network device if upgrading the network device will remove from service, more than a threshold percentage, for example, more than 50% of viable paths to a network segment, i.e., a portion of the network. For example, if there are two network devices that provide service to a network segment, upgrading one of the two network devices will block the upgrade of its peer based on this rule. In cases where the network has more than two devices providing service to the same segment, the system allows two devices to be upgraded at the same time, as long as 50% of the network capacity remains viable.

As shown in FIG. 4C, the network device C is currently upgrading. The system disallows upgrade of network device D while network device C is upgrading because network devices A and B have four paths to the tier above (C, D), and two of them are already out of service because network device C is upgrading. Similarly, network devices E and F have four paths to the tier below (C, D) and two of them are already out of service because network device C is upgrading. As a result, if the system simultaneously allows upgrade of network devices C and D, the system will violate this rule since more than 50% of viable paths to network devices A and B (or network devices E and F) will be lost. The system stores network topology information, for example, in network topology store 240 and analyzes the network topology graph to determine viable paths to various network segments. The system estimates the number of viable paths that will be lost if the upgrade of a particular network device is performed. The system determines whether to allow an upgrade of a particular network device to proceed based on the estimate of the number of viable paths to a network segment that will be lost if the upgrade of that particular network device is allowed to proceed.

Following is an example of upgrades based on the network topology illustrated in FIG. 1. The system starts with an upgrade list, Sw1-1a, Sw1-1b, Sw1-2a, and Sw1-2b and Agg2a and Agg2b. The system evaluates the rules for Sw1-1a and since no devices are currently being upgraded, the system starts the upgrade of Sw1-1a immediately. The system evaluates the rules for Sw1-1b and determines that rule R1 is violated since a directly connected network device is currently upgrading. The system puts Sw1-1b back in the queue. Next, the system repeats the process for Sw1-2a and Sw1-2b. The system allows upgrade of Sw1-2a to proceed but does not allow upgrade of Sw1-2b due to violation of rule R1. Accordingly, the system puts Sw1-2b in the queue to be picked up later.

The system next analyzes the aggregation routers Agg2a and Agg2b. The system allows upgrade of Agg2a since none of the rules are violated. The system next analyzes Agg2b. Since Agg2b is not directly connected to Agg2a rule R1 is not violated. Since the system has complete network topology information, rule R2 is not violated. The system analyzes rule R3 for Agg2b. The system determines that there are eight links between the aggregation layer and the core layer, and eight links between the aggregation layer and the access layer. Four of each of those links are out of service since Agg2a is upgrading. If the system starts upgrade of Agg2B, rule R3 will be violated since more than 50% of viable paths to the network devices of the set 150 of aggregation routes that form the aggregation layer or the set 160 of accesses switches that form a switch layer will be lost. Therefore, the system puts Agg2b in the queue and delays the upgrading of Agg2b.

The system waits for one or more network devices to complete the upgrade process before reprocessing the queue. Once the upgrade of Sw1-1a finishes the system reprocesses the queue. The system reprocesses the queue each time an upgrade is finished. As a result, the system ultimately upgrades the entire network device list and drains the queue. In this example, the system is able to automatically select two sets of three devices to safely upgrade in parallel without causing any outages for multi-homed servers in this network. The system may use the same topology and algorithm in the office space (also referred to as people space or office buildings). Accordingly, devices, such as phones and desktops, connected to a single access switch (Sw1* and Sw2*) would experience an outage when that switch was upgraded. However, the system allows aggregation router upgrades in a completely transparent fashion.

The system upgrades a list of network devices. The list may be stored in the queue. For each network device in the list, the system evaluates various rules to determine if the network device should be upgraded. If none of the rules are violated the system starts the upgrade of the network device and moves on to the next network device in the list. If the system finds a device that violates at least one rule, the system determines that upgrade of the network device cannot be started safely. The system puts the network devices at the end of the queue and keep processing. Once the system reaches the end of the original list of network devices, the system waits for some upgrades of network devices to finish and then process a network device from the queue. The system repeats this process until the system has started upgrades for all devices in the list and drained the queue completely. Using this upgrade workflow, the system is able to upgrade thousands of network devices in a short amount of time.

The techniques disclosed increase the speed with which a network is upgraded. Furthermore, the number of incidents and outages attributed to network issues are also significantly reduced due to these techniques.

Determining if Network Upgrade Completed Successfully

The system automatically performs upgrade of networks that may include a large number of network devices. A network upgrade may make several changes to the overall system. There may be certain devices that get upgraded successfully whereas some devices that do not upgrade successfully. For certain devices, some features may work as expected after the upgrade whereas some features may not work as expected. The system determines automatically whether the network upgrade completed successfully and if there were failures in upgrading, the system identifies specific devices that failed to upgrade as well as specific features that did not function as expected after the upgrade.

Figure 5:
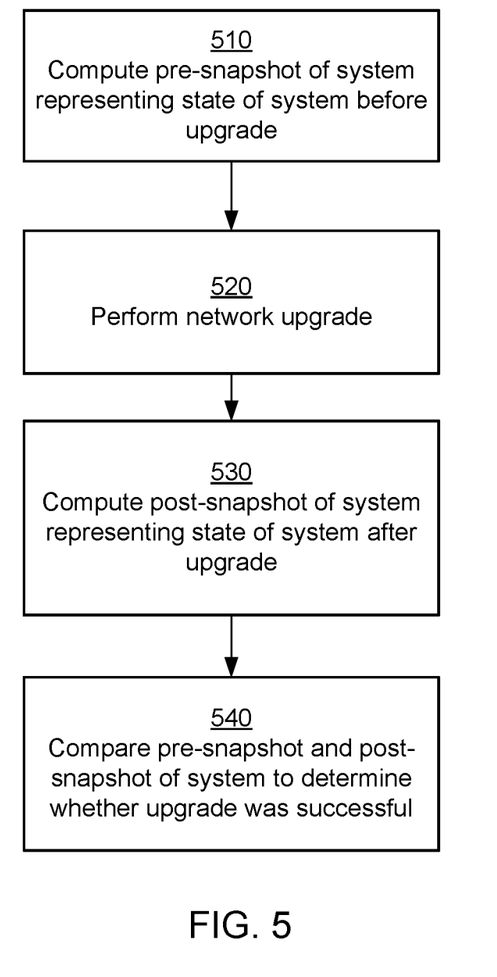
FIG. 5 shows a flowchart of a process for performing the network upgrade and determinizing whether the upgrade completed successfully according to an embodiment.

FIG. 5 shows a flowchart of a process for performing the network upgrade and determinizing whether the upgrade completed successfully according to an embodiment. The system computes 510 a pre-snapshot representing the state of the network device before performing the upgrade. The system performs 520 the network upgrade using the techniques disclosed herein, for example, using the process shown in FIG. 3. The system computes 510 a post-snapshot representing the state of the network device after performing the upgrade. The system compares the data of the pre-snapshot and the post-snapshot to determine whether the upgrade completed successfully for each network devices. For example, the comparison may show that the upgrade was unsuccessful for certain network devices and the system may send a message or an alert to some user, for example, a system administrator to review the results. The system administrator may run the upgrades again or take other corrective actions for the devices for which the upgrade did not complete successfully.

A snapshot of the system, for example, a pre-snapshot or a post-snapshot may be determined by extracting various attributes of the network devices. The attributes may be extracted by invoking certain APIs of software running on the network devices, such as the NOS. The attributes may be extracted by running certain commands on various network devices.

The information collected in a snapshot may include status of physical interfaces of network devices. For example, a switch may have N interfaces, of which N-M interfaces are determined to be up and running and M interfaces are determined to be down. The system collects the status of the interfaces before upgrade in the pre-snapshot and collects the status of the interfaces after upgrade in the post-snapshot. For example, the number of interfaces that are up or down may change after the upgrade. If more interfaces are down in the post-snapshot compared to the pre-snapshot, the system may send an alert to the system administrator indicating that the upgrade possibly caused some interface to stop running. An example, snapshot is as follows. The snapshot lists various interfaces and their status.

Interfaces:
{
   {vrf: 'default',
   name: '1/49',
   ipAddress: '192.0.2.1',
   status: 'up' },
   {vrf: 'default',
   name: '1/51',
   ipAddress: '192.0.2.5'
   status: 'up' },
   {vrf: 'default',
   name: 'loopback0',
   ipAddress: '192.0.2.9',
   status: 'up' },
   {vrf: 'management',
   name: 'management0',
   ipAddress: '192.0.2.13',
   status: 'up' },
   {vrf: 'INTERNAL',
   name: 'Vlan103',
   ipAddress: '192.0.2.15'
   status: 'up' } }
}

The system may generate a report after comparing the pre-snapshot and the post-snapshot identifying interfaces. For example, the report may identify interfaces for which the status changed as a result of the network upgrade.

[
  {
  "vrf": "default"
  "name": "1/49",
  "ipAddress": "192.0.2.1",
  "status-before": "up",
  "status-after": "down"
  }
]

According to an embodiment, the system receives an expectations specification representing the expected values of attributes of the snapshot or rules describing the possible valid changes of attributes or values of attributes after a network upgrade. The system uses the expectations specification to determine whether a network device upgraded successfully. A simple comparison of the snapshots does not provide the necessary information since there may be differences in the text of the pre-snapshot and post-snapshot for various reasons. All these changes may not represent an issue. Showing a simple textual comparison of pre-snapshot and post-snapshot may return a large number of differences that a user has to analyze to identify significant differences. Embodiments use the expectations specification to identify significant differences between the pre-snapshot and post-snapshot to identify network devices for which the network upgrade is likely to have failed and provide details of these differences between the pre-snapshot and post-snapshot to a system administrator for further analysis.

The expectations specification may provide a set of rules representing valid changes in attributes of network devices as captured in the snapshot. For example, a rule may specify that if an interface of a network device was up in the pre-snapshot, the interface should be up in the post-snapshot. If the system identifies a violation of the rule specified in the expectations specification, the system reports the corresponding network devices.

A rule may specify that if an interface of a network device was down in the pre-snapshot, the interface should be down in the post-snapshot. A rule may specify that if an interface of a network device was returning a specific error in the pre-snapshot, the interface may be up or down in the post-snapshot.

A rule may specify that the value of an attribute should not change after the upgrade. For example, a rule may specify that if a particular state attribute value is active or unknown in the pre-snapshot, the state attribute should have the same value active or unknown in the post-snapshot. A rule may specify that an attribute value should change after upgrade, i.e., the value of the attribute after upgrade should be different from the value of the attribute before upgrade. The rule may specify a set S1 of values for the attribute before upgrade and a set S2 of values for the attribute after upgrade. A rule may specify that an attribute representing availability of a certain feature should indicate that the feature is available after upgrade. The system may execute commands to add information describing features of various software or hardware components. A rule may specify that the result of such a command should include specific values, for example, a component should show specific values such as suffixes after the upgrade. The system compares values of various attributes in view of the expectations specification and may generate a report. According to an embodiment, the system may automatically take a remedial action, for example, execute a specific command in certain changes in attributes are observed between the pre-snapshot and the post-snapshot.

Computing Machine Architecture

Figure 6:
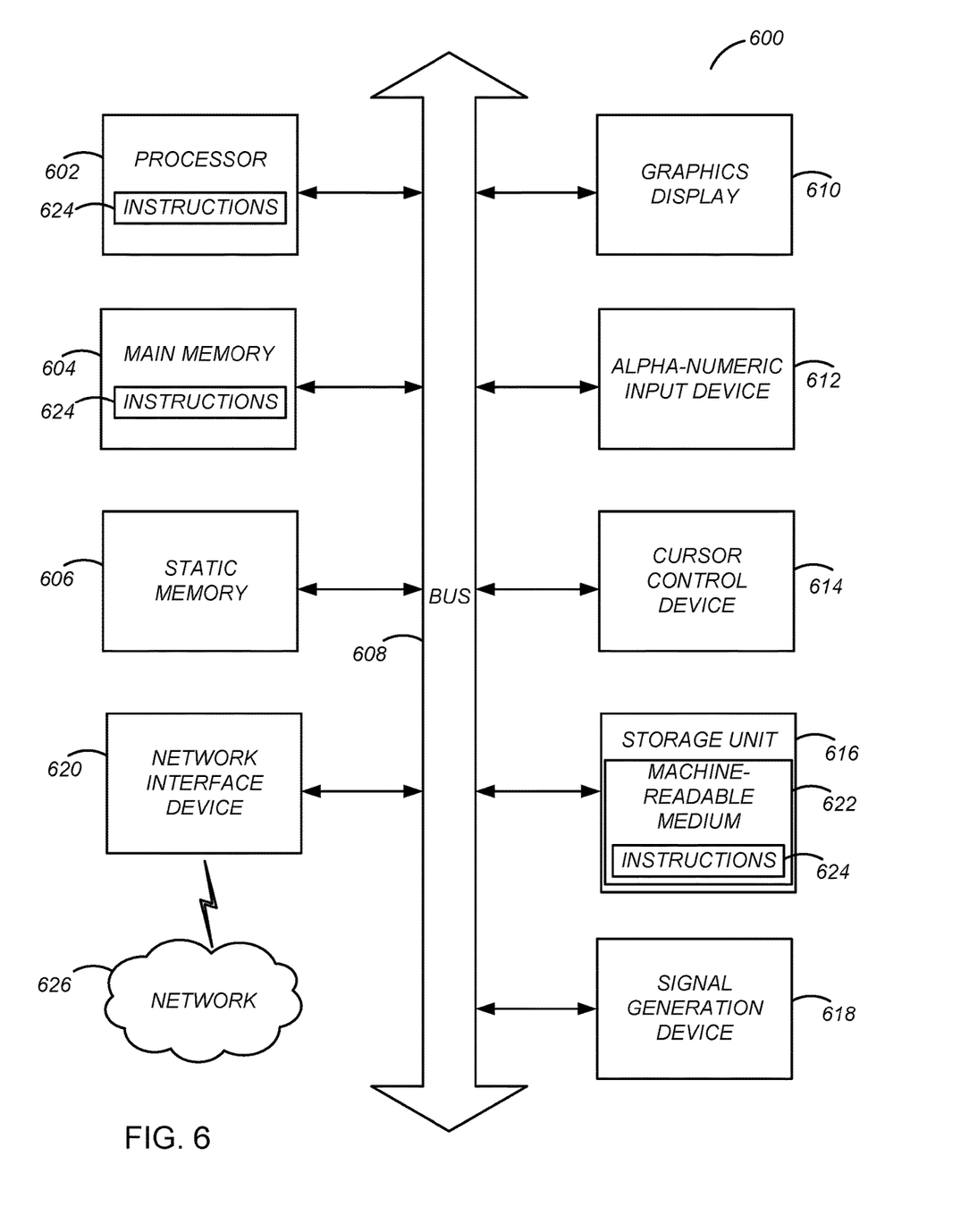
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which instructions 624 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include graphics display unit 610 (e.g., a plasma display panel (PDP), a liquid crystal display (LCD), a projector, or a cathode ray tube (CRT)). The computer system 600 may also include alphanumeric input device 612 (e.g., a keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

ALTERNATIVE EMBODIMENTS

It is to be understood that the figures and descriptions of the present invention have been simplified to illustrate elements that are relevant for a clear understanding of the present invention, while eliminating, for the purpose of clarity, many other elements found in a typical system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating reports based on instrumented software through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for upgrading a network, the method comprising:

receiving a request to upgrade a network comprising a plurality of network devices providing connectivity for a set of servers;

receiving a network topology of the network, the network topology represented as a topology graph;

performing network upgrade comprising, repeating:
  selecting a network device for upgrading;
  evaluating a set of upgrade criteria, each upgrade criterion based on a relation between the selected network device and one or more other network devices currently being upgraded, the set of upgrade criteria including an upgrade criterion indicating whether another network device directly connected to the selected network device is currently being upgraded;
  determining whether to upgrade the selected network device based on a result of evaluation of the set of upgrade criteria; and
  performing one of (1) upgrading the selected network device or (2) delaying upgrade of the selected network device based on the result of evaluation of the set of upgrade criteria and completing the upgrade of the selected network device after the delay; and
determining whether the network upgrade completed successfully.

2. The method of claim 1, wherein the set of upgrade criteria further includes an upgrade criterion that indicates that two network devices are not upgraded simultaneously if any of the two network devices has a neighboring network device with incomplete topology information.

3. The method of claim 1, wherein the set of upgrade criteria further includes an upgrade criterion that indicates that a network device is not upgraded if upgrading the network device will remove from service, more than a threshold percentage of viable paths to a portion of the network.

4. The method of claim 1, further comprising:
  adding a representation of each of the plurality of network devices to a queue, wherein selecting a network device for upgrading comprising selecting a network device from front of the queue.

5. The method of claim 4, wherein delaying upgrade of the selected network device comprises adding the representation of the selected network device to end of the queue.

6. The method of claim 1, wherein determining whether the network upgrade completed successfully comprises:
  determining a pre-snapshot comprising attributes representing a state of the network before network upgrade;
  determining a post-snapshot comprising attributes representing a state of the network after network upgrade; and
  comparing the pre-snapshot and the post-snapshot to determine whether upgrade of one or more network devices failed.

7. The method of claim 6, wherein each of the pre-snapshot and the post-snapshot comprises attributes based on status of physical interfaces of each of the plurality of network devices.

8. The method of claim 6, further comprising:
  receiving an expectations specification specifying relations between value of an attribute of a snapshot before upgrade and after upgrade, wherein comparing the pre-snapshot and the post-snapshot is based on the expectations specification.

9. A computer readable non-transitory storage medium storing instructions, the instructions when executed by one or more computer processors cause the one or more computer processors to perform steps comprising:
  receiving a request to upgrade a network comprising a plurality of network devices providing connectivity for a set of servers;
  receiving a network topology of the network, the network topology represented as a topology graph;
  performing network upgrade comprising, repeating:
    selecting a network device for upgrading;
    evaluating a set of upgrade criteria, each upgrade criterion based on a relation between the selected network device and one or more other network devices currently being upgraded, the set of upgrade criteria including an upgrade criterion indicating whether another network device directly connected to the selected network device is currently being upgraded;
    determining whether to upgrade the selected network device based on a result of evaluation of the set of upgrade criteria; and
    performing one of (1) upgrading the selected network device or (2) delaying upgrade of the selected network device based on the result of evaluation of the set of upgrade criteria and completing the upgrade of the selected network device after the delay; and
  determining whether the network upgrade completed successfully.

10. The computer readable non-transitory storage medium of claim 9, wherein the set of upgrade criteria further includes an upgrade criterion that indicates that two network devices are not upgraded simultaneously if any of the two network devices has a neighboring network device with incomplete topology information.

11. The computer readable non-transitory storage medium of claim 9, wherein the set of upgrade criteria further includes an upgrade criterion that indicates that a network device is not upgraded if upgrading the network device will remove from service, more than a threshold percentage of viable paths to a portion of the network.

12. The computer readable non-transitory storage medium of claim 9, wherein the instructions further cause the one or more computer processors to perform steps comprising:
  adding a representation of each of the plurality of network devices to a queue, wherein selecting a network device for upgrading comprising selecting a network device from front of the queue.

13. The computer readable non-transitory storage medium of claim 12, wherein delaying upgrade of the selected network device comprises adding the representation of the selected network device to end of the queue.

14. The computer readable non-transitory storage medium of claim 9, wherein instructions for determining whether the network upgrade completed successfully, further cause the one or more computer processors to perform steps comprising:
  determining a pre-snapshot comprising attributes representing a state of the network before network upgrade;
  determining a post-snapshot comprising attributes representing a state of the network after network upgrade; and
  comparing the pre-snapshot and the post-snapshot to determine whether upgrade of one or more network devices failed.

15. The computer readable non-transitory storage medium of claim 14, wherein each of the pre-snapshot and the post-snapshot comprises attributes based on status of physical interfaces of each of the plurality of network devices.

16. The computer readable non-transitory storage medium of claim 14, wherein the instructions further cause the one or more computer processors to perform steps comprising:
receiving an expectations specification specifying relations between value of an attribute of a snapshot before upgrade and after upgrade, wherein comparing the pre-snapshot and the post-snapshot is based on the expectations specification.

17. A computer-implemented system for upgrading a network, the system comprising:
one or more computer processors; and
a computer readable non-transitory storage medium storing instructions, the instructions when executed by the one or more computer processors cause the one or more computer processors to perform steps comprising:
receiving a request to upgrade a network comprising a plurality of network devices providing connectivity for a set of servers;
receiving a network topology of the network, the network topology represented as a topology graph;
performing network upgrade comprising, repeating:
selecting a network device for upgrading;
evaluating a set of upgrade criteria, each upgrade criterion based on a relation between the selected network device and one or more other network devices currently being upgraded, the set of upgrade criteria including an upgrade criterion indicating whether another network device directly connected to the selected network device is currently being upgraded;
determining whether to upgrade the selected network device based on a result of evaluation of the set of upgrade criteria; and
performing one of (1) upgrading the selected network device or (2) delaying upgrade of the selected network device based on the result of evaluation of the set of upgrade criteria and completing the upgrade of the selected network device after the delay; and
determining whether the network upgrade completed successfully.

18. The computer-implemented system of claim 17, wherein instructions for determining whether the network upgrade completed successfully further cause the one or more computer processors to perform steps comprising:
determining a pre-snapshot comprising attributes representing a state of the network before network upgrade;
determining a post-snapshot comprising attributes representing a state of the network after network upgrade; and
comparing the pre-snapshot and the post-snapshot to determine whether upgrade of one or more network devices failed.

19. The computer-implemented system of claim 17, wherein the set of upgrade criteria further includes an upgrade criterion that indicates that two network devices are not upgraded simultaneously if any of the two network devices has a neighboring network device with incomplete topology information.

20. The computer-implemented system of claim 17, wherein the set of upgrade criteria further includes an upgrade criterion that indicates that a network device is not upgraded if upgrading the network device will remove from service, more than a threshold percentage of viable paths to a portion of the network.

* * * * *